United States Patent [19]

Wavre

[11] 4,247,749
[45] Jan. 27, 1981

[54] ELECTRICAL DISCHARGE MACHINING APPARATUS AND PROCESS WITH CONTROLLED VARIABLE SPEED ELECTRODE ORBITING

[75] Inventor: Alain Wavre, Geneva, Switzerland

[73] Assignee: Ateliers des Charmilles S.A., Geneve, Switzerland

[21] Appl. No.: 14,292

[22] Filed: Feb. 23, 1979

Related U.S. Application Data

[63] Continuation-in-part of Ser. No. 787,757, Apr. 15, 1977, abandoned.

[51] Int. Cl.³ ............................................. B23P 1/12
[52] U.S. Cl. ................................ 219/69 V; 219/69 M
[58] Field of Search ............... 219/69 M, 69 V, 69 G, 219/69 C

[56] References Cited

U.S. PATENT DOCUMENTS

| 3,975,608 | 8/1976 | Ullmann et al. | 219/69 V |
| 4,041,268 | 8/1977 | Braudeau et al. | 219/69 V |
| 4,049,942 | 9/1977 | Balleys et al. | 219/69 G |
| 4,057,703 | 11/1977 | Pfau | 219/69 M |

*Primary Examiner*—C. C. Shaw
*Attorney, Agent, or Firm*—Hauke and Patalidis

[57] ABSTRACT

A process and apparatus for an EDM machine provided with an overcut drive mechanism for orbiting the electrode tool relative to the electrode workpiece in a cyclical motion, comprising a control for the orbital mechanism which varies the velocity of the cyclical orbital motion as a function of the difference between the orbital path actually obtained and a reference orbital path, such as to simultaneously provide a control of the workpiece shape and maintain the machining gap and, therefore, the machining current substantially constant.

6 Claims, 8 Drawing Figures

ELECTRICAL DISCHARGE MACHINING APPARATUS AND PROCESS WITH CONTROLLED VARIABLE SPEED ELECTRODE ORBITING

CROSS-REFERENCE

This application is a continuation-in-part of application Ser. No. 787,757, filed Apr. 15, 1977, now abandoned.

BACKGROUND OF THE INVENTION

In the EDM field, it is known to translate the electrode tool and the electrode workpiece relative to each other according to a cyclical motion, or orbiting motion, along a path situated on a surface of revolution of a predetermined shape, with the result that the machining gap between the electrodes is decreased over a portion of the machined surface and the machining zone is caused to be cyclically displaced. It is also known to vary as a function of the machining gap width, at least during one orbital cycle, the speed at which the cyclical orbital motion is effected such as to remove, from all the machining surface of the workpiece, the same quantity of material per unit of surface, as disclosed in U.S. Pat. No. 4,057,703.

According to those known processes, however, it is not possible to simultaneously control constantly the machining conditions, that is the machining gap width, while maintaining the accuracy of the workpiece shape. This is due to the fact that the known processes consist in limiting to a predetermined path the orbiting trajectory and in varying the speed of relative translation of the electrodes as a function of the variations of a quantitative value representing the machining gap width. A simultaneous control of the machining gap width and of the speed of relative displacement of the electrodes can be accomplished only by providing a stored program of the speed once the motion path has been predetermined.

The present invention, by contrast, permits to control the shaping of the workpiece surface relative to the tool shape while simultaneously controlling the machining gap width. The control of the orbiting speed is effected as a function of another magnitude which varies as a function of the amount of mismatch between the shape of the surface machined on the workpiece and that of the electrode tool. This magnitude is equal to the instantaneous amplitude of the translation motion.

The present invention has therefore for principal object to improve the machining efficiency of an EDM machine and to provide a continuous positive control of the workpiece shape as machining progresses, such as to uniformly enlarge the shape of the workpiece.

SUMMARY OF THE PRESENT INVENTION

The EDM process and apparatus of the present invention in addition to providing a control of the amplitude of the orbiting motion, such as to maintain predetermined machining conditions in the machining gap, provides a comparison between the orbiting path resulting from such control and a reference path, and it further provides means for varying the speed at which the orbiting motion is effected as a function of the differences between the actual orbiting path and a reference path, such as to hold that difference within well-determined limits. The present invention further relates to an apparatus for accomplishing the process of the invention.

The invention will be best understood by those skilled in the art when the following description of the best mode contemplated for practicing the invention is read in conjunction with the accompanying drawing which, schematically, illustrates the principle of the invention together with two embodiments of an apparatus according to the invention for practicing the method of the invention. In the accompanying drawing:

DETAILED DESCRIPTION OF THE PREFERRED EMBODIMENTS

Figure 1:
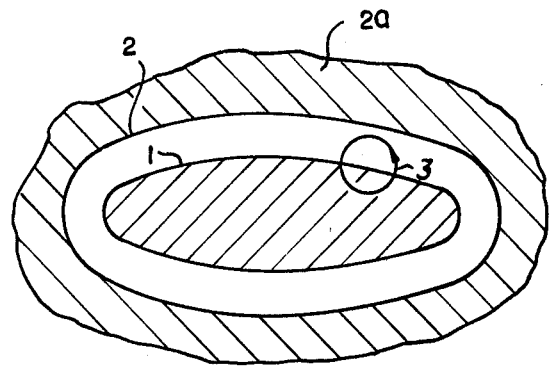
FIGS. 1-6 illustrate three different examples of cavity shapes obtained in a workpiece by way of the present invention.

Referring now to the drawing, FIG. 1 illustrates schematically the beginning of a machining operation and shows a transverse section through an electrode tool 1, having an elliptical section, which is used to form by electrical discharges a cavity 2, also of elliptical shape, in an electrode workpiece 2a. The machining operation is effected by applying to the electrode tool 1 a cyclical orbital circular motion along the path 3.

Figure 2:
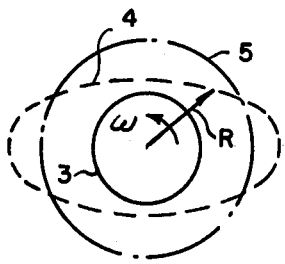

FIG. 2 is an illustration of how the circular orbital motion of the electrode tool normally evolves in the course of a complete machining operation. The circle identified by numeral 3 represents the orbiting path at the beginning of the machining operation. If the electrode tool is displaced along the circular path 3 at a constant angular speed $\omega$, it will be readily apparent from FIG. 1 that the amount of material removed from the workpiece 2a for a given arc of the circle of the path 3 is greater when the machining zone corresponds to the side of the electrode tool 1 corresponding to its elliptical shape major axis than it is when the machining zone is on the side of the electrode tool corresponding to its elliptical shape minor axis. Consequently, with a conventional orbiting motion control system which tends to maintain constant the machining gap width, the circular path 3 degenerates gradually into an elliptical path 4 of variable radius R. According to the present invention however, and for the purpose of avoiding the gradual degradation of the circular orbital path into an elliptical path, a comparison is continuously effected between the actual orbiting path of the electrode tool and a reference circular path such as, for example, the reference circle 5 of FIG. 2. By measuring the instantaneous difference between the reference path and the actual path, the speed of orbital motion of the electrode tool is adjusted as a function of that difference, within predetermined limits. If, as arbitrarily shown at FIG. 2, the reference path 5 has a radius equal to the average or median radius of the actual elliptical path 4, the plus or minus algebraic sign of the difference can be used for variably controlling the orbiting speed. By choosing a very small difference for controlling a substantial speed variation, an actual orbiting path can be obtained which is as close as desired to an ideal path, within any desired tolerance.

Figure 3:
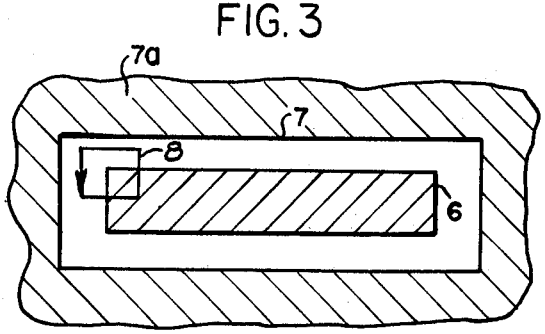
Figure 4:
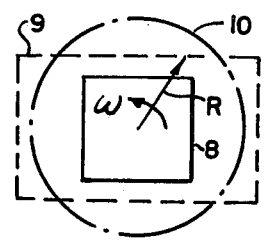

FIGS. 3 and 4 schematically illustrate what takes place in the case of using a rectangular, in cross-section, electrode tool 6 for forming a rectangular cavity 7 in a workpiece 7a by causing the electrode tool 6 to be translated along a square orbiting path. If no particular precautions are taken, the square orbiting path 8, FIG. 4, will gradually deteriorate into the rectangular orbiting path 9. It is surprising to observe that if the actual orbiting path is compared to a reference circular path as, for example, shown at 10, the gradual deterioration of the square orbiting path 8 into the rectangular path 9 is entirely avoided.

This is due to the fact that the instantaneous difference between the actual orbiting path and the reference circular path continuously varies relative to one side of the square path, which therefore results in a speed of translation varying accordingly with respect to that side. However, when the path follows the next side of the square orbiting path which is at a 90° angle with the first trajectory, the speed control causes a variation of the translation speed which is of an opposite algebraic sign and which is a function of the area of the surface to be machined.

Consequently, the degradation of the trajectory of the orbital path, which is greater for the long side of the rectangle which requires a large amount of material removal than for the short side of the rectangle, is automatically compensated for, because the speed control tends to maintain the four sides of the orbiting path at an equal distance from the reference circular path.

Figure 5:
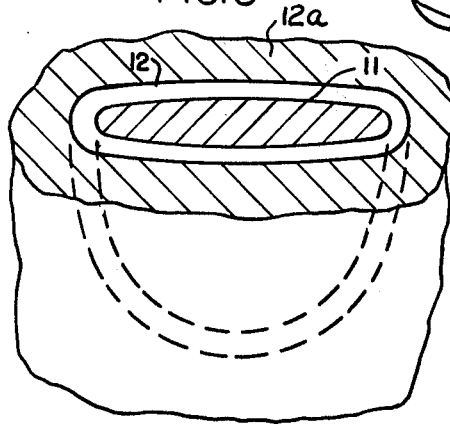
Figure 6:
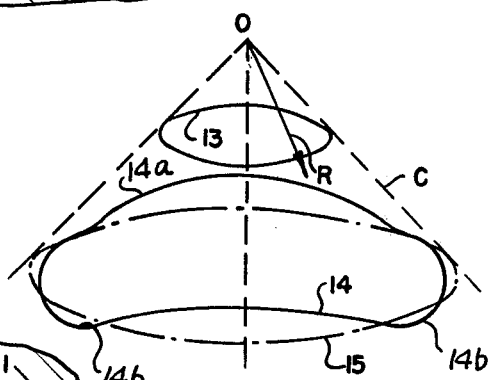

FIGS. 5 and 6 schematically illustrate the conditions present when the electrode tool is displaced along a surface of revolution, which can be achieved, for example, by orbiting the electrode tool 11 along a circular path having a radius which varies as a function of the feed of the electrode tool within an electrode workpiece 12a in order to machine a cavity such as cavity 12. As schematically illustrated at FIG. 6, if the variation of the radius of circular translation motion of the electrode tool is a linear function, the surface of revolution described by the electrode tool is a solid cone C. The circle 13 represents the orbiting path at the beginning of the machining operation, the path 14 illustrates the degraded orbiting path and the circle 15 represents the reference circle. The degraded orbiting path 14, which in turn causes a deformation of the workpiece machined surface, comprises a portion 14a which is displaced upwardly relative to the reference path 15, and a portion 14b which is displaced downwardly relative thereto. In order to re-establish the orbiting path to provide the workpiece with the desired contour, more material must be removed from the workpiece surface during the portion 14a of the orbiting path and less material must be removed during the portion 14b of the orbiting path. Consequently, the feed of the electrode tool towards the machining surface must be increased while effecting the portion 14a of the orbiting path and decreased while effecting the portion 14b of the orbiting path. By determining the error between the actual path 14 and the reference orbiting path 15, a command signal may be obtained to constantly adjust the orbiting speed while continuously maintaining the machining current to a maximum value.

Utilizing the error signal as a command signal, as previously indicated, is what is accomplished by the present invention. It is readily apparent that the present invention presents a great advantage over the known methods and apparatus utilizing as a command signal the variations of machining current. The known methods and apparatus do not permit to maintain the machining current to its maximum value because it is necessary to allow the machining current to vary in order to develop the command signal.

Figure 7:
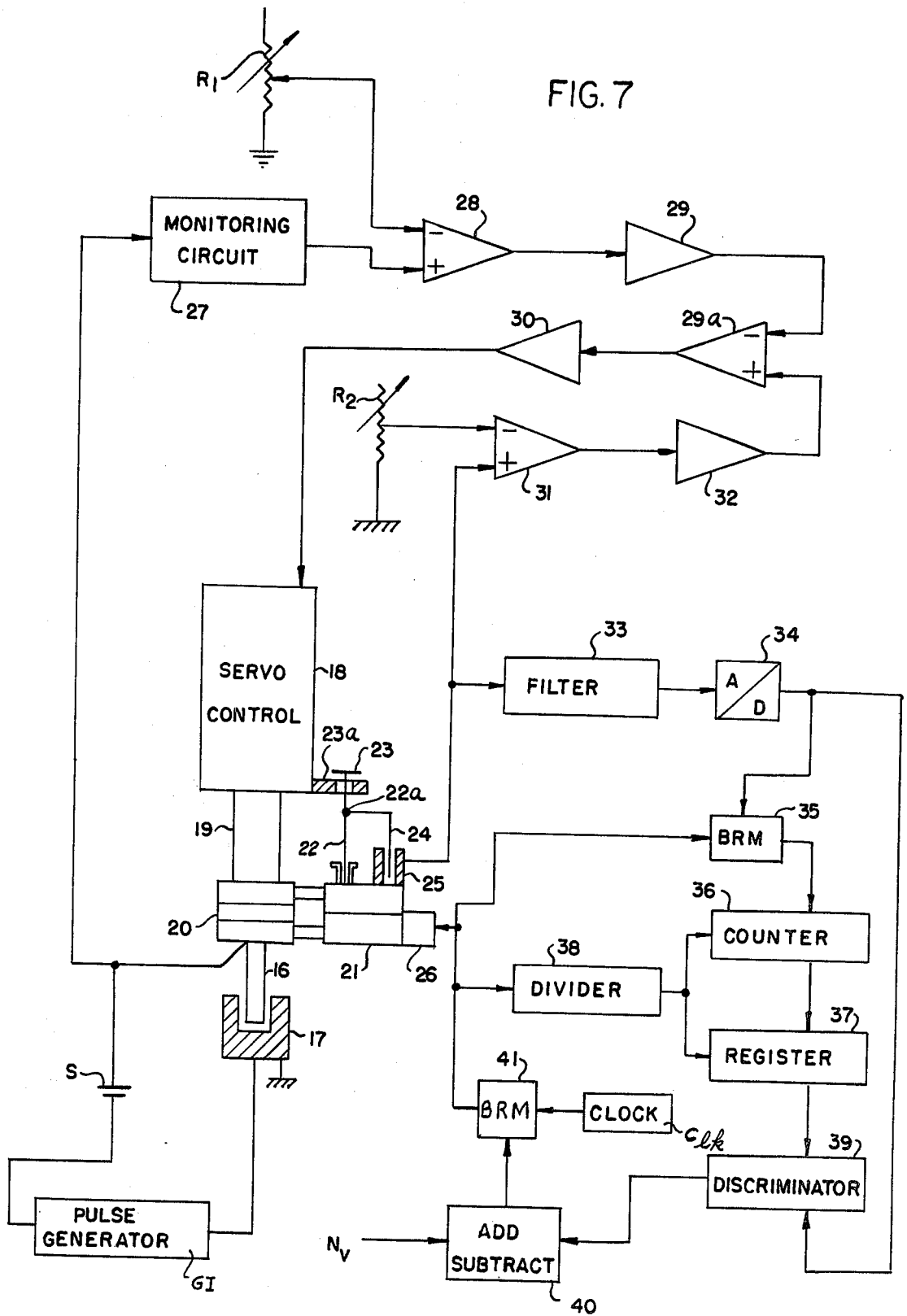
FIGS. 7 and 8 illustrate schematic diagrams of circuits according to the present invention.

Referring now to FIG. 7, there is illustrated in the form of a block diagram an embodiment of a circuit for practicing the process of the invention. An electrode tool 16 is used for forming a cavity in an electrode workpiece 17 by way of electrical machining discharges occurring across the gap between the electrode tool and the workpiece surface. The electrical discharges are obtained from a DC source S schematically shown connected in series with a pulse generator GI. The electrode tool 16 is fed towards the workpiece 17 by means of a servocontrol mechanism 18 displacing a ram 19. The ram 19 holds on its end a table 20 provided with ways disposed at right angles for laterally displacing the electrode tool 16, mounted on the bottom of the table, along a cyclical orbiting motion. The orbiting motion, which is circular, is controlled by an eccentric mechanism 21 whose eccentricity is determined by a rod 22 provided with a collar 23 adapted to engage an abutment 23a dependent from the housing of the servo control 18. The eccentric mechanism 21 may be arranged according to the mechanism disclosed, for example, in U.S. Pat. No. 4,104,500 or in U.S. Pat. No. 3,809,852, arranged such as to increase the amount of eccentricity as a function of the feed of the electrode tool into the workpiece. In this manner, when the ram 19 is displaced by the servo control 18 downwardly, with reference to FIG. 7, the eccentric mechanism 21 is also displaced downwardly, and as soon as the collar 23 engages the abutment 23a, the rod 22 controls the displacement of the eccentric mechanism 21 transversely, thus causing an increase of the radius of the orbital path.

A finger 24 supported by the rod 22 at 22a is displaced as a function of the displacement of the rod 22 after its collar 23 engages the abutment 23a, and the amount of displacement of the finger 24 is converted by a position detector or transducer 25 into an electrical signal representative of the amount of displacement of the rod 22. The eccentric mechanism 21 is driven by a stepping electric motor 26.

The machining voltage is applied to the input of a monitoring circuit 27 supplying at its output an electrical signal which is an analogue representation of the width of the machining gap between the electrode tool 16 and the workpiece 17. The signal at the output of the monitoring circuit 27, which is a voltage having an amplitude which is a function of the machining gap, is compared in a comparator 28 to a reference voltage obtained from a potentiometer $R_1$. The comparator 28 supplies at its output a signal which is the difference between the voltage provided at the output of the monitoring circuit 27 and the reference voltage from the potentiometer $R_1$, and the signal at the output of the comparator 28 is applied through an op-amp amplifier 29 to an input of a second comparator 29a. The signal from the position transducer 25 is compared by a comparator 31 to a reference voltage supplied by a portentiometer $R_2$. The signal at the output of the comparator 31 is applied through an amplifier 32 to the other input of the comparator 29a, and the resulting signal at the output of the comparator 29a, after being amplified by an amplifier 30, is applied to the servo control 18 as a command signal. The potentiometer $R_2$ permits to establish a limit value for the radius of the orbiting motion, because as soon as the signal supplied by the transducer 25 exceeds the reference signal set by the potentiometer $R_2$, the signal at the output of the amplifier 32 opposes the signal at the output of the amplifier 29, and the signal at the output of the comparator 29a drops to zero such that the servo control 18 ceases to feed the electrode tool 16 into the workpiece 17. Such an arrangement is described in detail in U.S. Pat. No. 4,049,942.

The signal supplied by the position transducer 25 is also supplied through a filter 33 to an analog/digital converter 34. The analog/digital converter 34 provides at its output a binary signal, representative of the signal at the output of the position transducer 25, which is in turn applied to an input of a binary rate frequency multiplier circuit 35. The other input of the binary rate frequency multiplier circuit 35 receives a command pulse signal applied to the stepping motor 26. In this manner, the binary rate frequency multiplier circuit 35 supplies at its output a pulse signal of a frequency which is representative of the product of the radius of the orbiting motion by the instantaneous angular speed of the orbiting motion.

The pulse signals at the output of the binary rate frequency multiplier circuit 35 are applied to a counter 36 which counts the number of pulses within a predetermined time interval, and transfers the count for storage into a register 37. The time interval is obtained from a divider 38 receiving at its input the control signals for the stepping motor 26. The divider 38 divides the number of pulses received at its input by a number stored in its register which corresponds to the number of pulses required to be applied to the stepping motor 26 to effectuate a complete orbiting cycle. Each time the product of the division in the divider 38 is equal to one, a pulse is supplied at the output of the divider 38 which causes the counter 36 to transfer into the register 37 the number of pulses counted by the counter 36 during the time interval.

The number stored in the register 37 is applied to an input of a numerical discriminator 39 having another input receiving the binary signal from the analog/digital converter 34. The discriminator 39 drives an adder-subtractor 40 having a number $N_v$, representing the nominal speed of translation, applied to its other input. The adder-subtractor 40 in turn drives a binary rate frequency multiplier circuit 41 having a second input receiving pulses from a clock $C_{lk}$. The binary rate frequency multiplier 41 supplies at its output the control signals for the stepping motor 26.

In the arrangement of FIG. 7, the signal at the output of the binary rate frequency multiplier 35 has a frequency proportional to the product of the orbiting path radius by the angular speed of the orbiting motion. Consequently, the signal at the output of the binary rate frequency multiplier 35 is representative of the instantaneous peripheral speed of the electrode tool orbiting path. As the pulses which are representative of that speed are counted by the counter 36 during a complete orbiting cycle, the number transferred from the counter 36 to the register 37 corresponds to the integral of the speed during a complete orbiting cycle. Such a number is thus proportional to the perimeter of the path and, consequently, to the radius of the path. The output from the register 37 is therefore representative of the average radius of the real orbiting path, such an average radius being used to define the radius of the reference circular path. The average radius is constantly compared by the discriminator 39 with the instantaneous radius of the orbiting path defined by the signal at the output of the analog/digital converter 34.

In this manner, the signal at the output of the discriminator 39 is a function of the difference, or error, between the instantaneous radius of the orbiting path and the average radius in the course of the immediately preceding prior orbiting cycle. This error signal, whose influence may be modified according to the value given to the number $N_v$ applied to the other input of the adder-subtractor circuit 40, controls the binary rate frequency multiplier circuit 41 to vary the frequency of its output pulses as a function of the error signal amplitude. Therefore, the instantaneous peripheral speed of the electrode tool 16 about its orbiting path is automatically adjusted by comparison with an ideal reference circular path.

Figure 8:
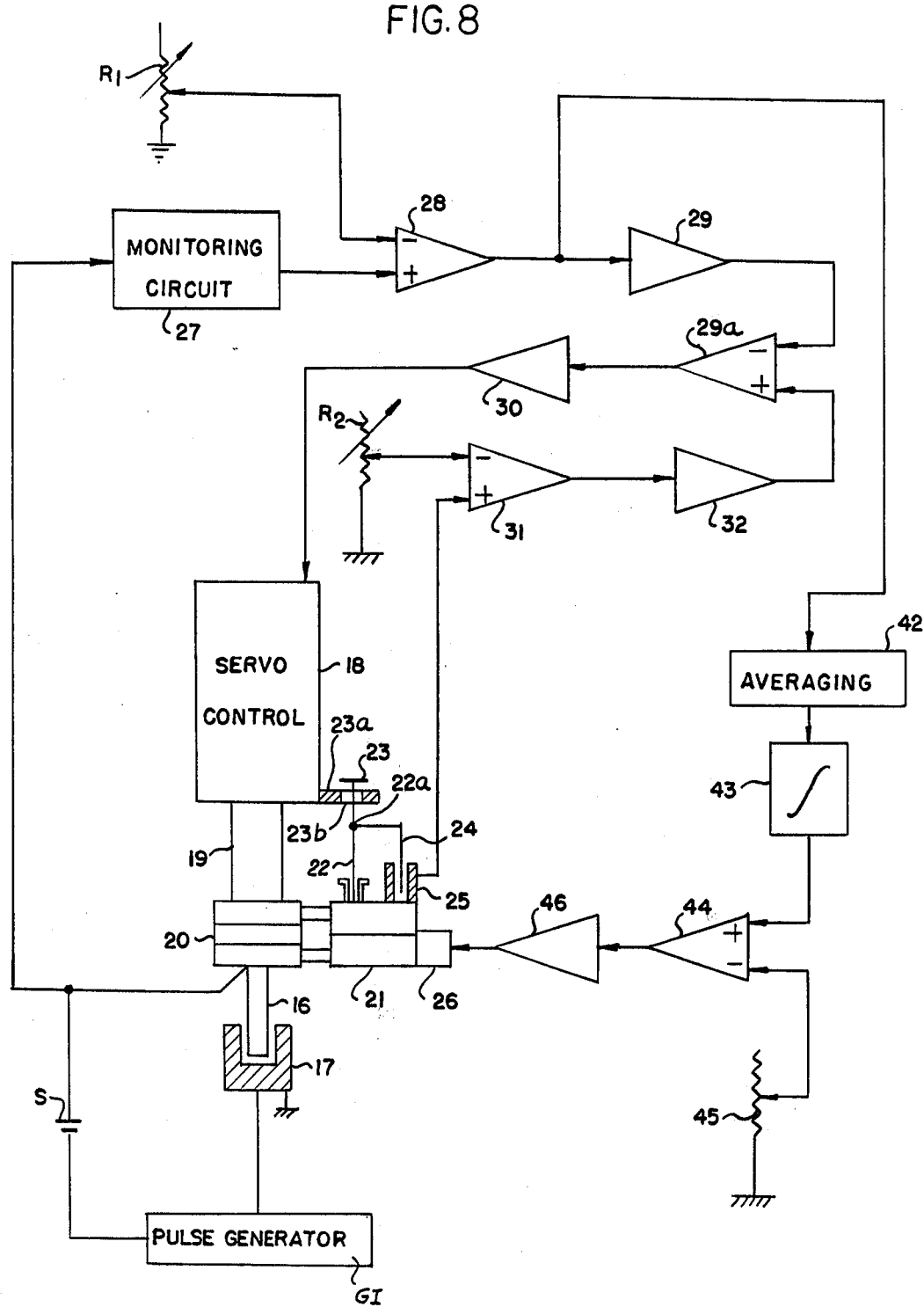

FIG. 8 illustrates schematically a circuit diagram which is, for the major part, identical to the circuit of FIG. 7. The principal difference between the schematic of FIG. 7 and that of FIG. 8 consists of the means used in the schematic of FIG. 8 for controlling the speed of the orbiting motion as a function of a reference path. In the schematic of FIG. 8, the command signal is obtained from the signal at the input of the amplifier 29, such an input signal being the difference between the instantaneous machining gap width and the reference width set by the potentiometer $R_1$. This signal, representing the difference between the two values, is an analog signal which is applied to an averaging circuit 42 whose function it is to establish an average value of the difference. The average value of the difference is therefore a representation of the speed at which varies the amplitude of the orbiting motion in the course of an orbiting cycle, because the input signal into the amplifier 29 controls the speed of advance of the ram 19 as actuated by the servo control 18 and, consequently, at the same time the eccentricity of the orbiting motion through the eccentric mechanism 21 having a variably controllable eccentricity.

The signal at the output of the averaging circuit 42 is applied to the input of an integrator 43 which supplies at its output a signal representative of the variation of the radius of the orbiting path in the course of a single orbiting cycle. This output signal is compared in a comparator 44 to a predetermined constant voltage supplied by a potentiometer 45, such constant voltage being representative of the constant radius of a reference circular path. In this manner, by comparing the signal at the output of the integrator 43 applied to the input of the comparator 44 with the constant reference signal applied to the other input of the comparator, a signal is obtained at the output of the comparator 44 having an amplitude varying as a function of the difference between the radius of the orbital path and the radius of the reference path. That variable amplitude signal, after amplification by an amplifier 46, controls the motor 26 which, in the arrangement illustrated at FIG. 7 is not a stepping motor, but rather a DC motor having a speed of rotation which is proportional to its input voltage.

It will be appreciated that the relative translation motion of the electrode tool 16 and electrode workpiece 17 relative to each other is referred to throughout the specification and the appended claims as an orbiting or orbital motion, although such movement of translation is not, in all cases, a truly and geometrically orbiting motion along a curvilinear path. The expression "orbiting" or "orbital" motion has been selected for the sake of simplification, and because it has apparently acquired significance in the art by analogy with other methods and apparatus for removing material from a workpiece, such as orbital sanders and grinders wherein the tool is transversely oscillated or translated during feed of the tool towards and into the workpiece, whether such motion of translation or oscillation of the tool is effected along a linear path, a curvilinear path, a square path, or a rectangular path.

Having thus described the present invention by way of practical examples of embodiments thereof, modifications whereof will be readily apparent to those skilled in the art, what is claimed as new is as follows:

1. In an EDM process for machining by means of electrical discharges occurring across a machining gap between an electrode tool and an electrode workpiece, wherein the electrodes are relatively displaced according to an orbital translational motion such as to provide a cyclical displacement of the machining zone, the amplitude of the orbiting motion being controllably adjusted such as to maintain predetermined electrical discharge conditions within the machining zone, the method comprising comparing the actual orbiting path thus obtained with a reference orbiting path, and varying the speed of the orbiting motion as a function of the difference between said two paths such as to maintain said difference within predetermined limits.

2. The method of claim 1 wherein the reference path is a circle disposed in a plane perpendicular to the axis of advance of the electrode tool relative to the electrode workpiece.

3. The method of claim 2 wherein the orbiting path is along a surface of revolution having an axis coinciding with the axis of advance of the electrode tool relative to the workpiece, said reference circle being also disposed with its perimeter on said surface of revolution.

4. In an apparatus for machining an electrode workpiece by means of electrical discharges resulting from voltage pulses being applied across a machining gap between an electrode tool and said electrode workpiece wherein the electrodes are relatively displaced according to a translational orbital motion such as to provide a cyclical displacement of the machining zone, said apparatus comprising means for varying the amplitude of the orbital motion such as to maintain predetermined electrical conditions within the machining zone, the improvement comprising means for obtaining an electrical signal of a value representative of the difference between the amplitude of the orbiting motion and a reference value representing a reference orbiting path, and means for varying the speed at which the orbiting motion is effected as a function of said electrical signal.

5. The improvement of claim 4 comprising means for obtaining an average value of said amplitude in the course of a time interval corresponding to an orbiting cycle, and means for giving to said reference value a value proportional to said average value in the course of the following orbiting cycle.

6. The improvement of claim 5 comprising means for measuring the variation of one of the signals regulating the speed of the variation of said amplitude in the course of an orbiting cycle, means for integrating said variations in the course of an orbiting cycle, and means for giving to said electrical signal a value representative of the difference between the value of said integration and a reference value.

* * * * *